3,085,003
COMPOSITIONS STABILIZED WITH 3,5-DIALKYL-4 HYDROXYBENZYL ALCOHOL
Rupert C. Morris, Berkeley, Calif., assignor to Shell Oil Company, a corporation of Delaware
No Drawing. Filed Aug. 11, 1959, Ser. No. 832,905
20 Claims. (Cl. 44—78)

This invention relates to novel stabilized organic compositions. More particularly, it relates to organic compositions stabilized with a novel benzyl alcohol antioxidant.

It is well known that most organic materials exposed to air undergo oxidative deterioration. For example, gasolines made by the cracking of heavier petroleum oils or by the polymerization of normally gaseous hydrocarbons contain constituents which, upon oxidation, form gums and color-imparting bodies, and thus deposit gums or discolor on storage and handling. Foodstuffs, particularly oleaginous substances as shortening, butter, lard and fatty meats, turn rancid upon prolonged storage. Elastomeric polymers, including synthetic and natural rubbers, crack and harden; and such polymeric olefinic substances as polythene and polypropylene become brittle. As a consequence, it has become practice to incorporate into these organic materials and others a small amount of stabilizer which enables the resulting mixture to resist oxidative deterioration without, however, impairing its other useful properties.

Two main classes of stabilizers have been used for these applications, phenolic inhibitors and amine inhibitors. In the first class are such well-known materials as 2,6-di-tert-butyl-4-methyl phenol (Tenox, BHT, Ionol) and bisphenolic compounds such as bis(2-hydroxy-3-tert-butyl-5-methylphenyl) methane (2246, CAO–5) and bis-(3,5-di-tert-butyl-4-hydroxyphenyl) methane (AN–2). In the second class are the p-phenylenediamines and N-substituted p-phenylenediamines (Tenamene-2, Eastozone-30).

It is an object of the present invention to provide stabilized compositions containing a novel antioxidant. A further object of the invention is the provision of compositions which resist oxidative deterioration but whose other desirable properties are unimpaired. The provision of a process for preparing such stabilized compositions is another object. Other objects will be apparent from the following description of the invention.

These objects are accomplished in the invention by a stabilized composition comprising an organic material subject to oxidative deterioration, having in intimate contact therewith an amount of 3,5-dialkyl-4-hydroxybenzyl alcohol sufficient to stabilize the material against oxidation. Such organic materials include, as will be seen, foodstuffs, hydrocarbons, oleaginous materials, polymers, and esters.

The 3,5-dialkyl-4-hydroxybenzyl alcohols are those compounds having the structure

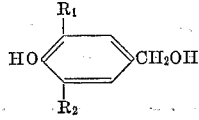

wherein $R_1$ and $R_2$ are alkyl radicals which may be the same or different. Representative compounds include 3,5-dimethyl-4-hydroxybenzyl alcohol, 3-methyl-5-ethyl-4-hydroxybenzyl alcohol, 3-ethyl-5-propyl-4-hydroxybenzyl alcohol, and 3-methyl-5-hexyl-4-hydroxybenzyl alcohol.

Since the antioxidant properties of the hydroxybenzyl alcohols improve as the phenolic hydroxyl group becomes more hindered, the preferred hydroxybenzyl alcohols are those having at least one relatively large and preferably branched alkyl substituent on the benzyl nucleus ortho to the hydroxyl group. Of these, the alkyl radicals having from 3 to 8 carbon atoms are most preferred. The alkyl radical may be aliphatic or it may be cycloaliphatic, e.g., cyclopentyl, cyclohexyl. The alkyl radicals falling into this class include secondary alkyl radicals, e.g., isopropyl, sec-butyl, sec-amyl, sec-hexyl and cyclohexyl; and tertiary alkyl radicals, e.g., tert-butyl, tert-amyl, tert-heptyl, tert-octyl and 1-methylcyclohexyl. Representative hydroxybenzyl alcohols having one branched group are 3-isopropyl-5-methyl-4-hydroxybenzyl alcohol, 3-t-butyl-5-methyl-4-hydroxybenzyl alcohol, 3-sec-butyl-5-ethyl-4-hydroxybenzyl alcohol, and 3-sec-amyl-5-propyl-4-hydroxybenzyl alcohol. Typical hydroxybenzyl alcohols having two branched groups ortho to the phenolic hydroxyl are 3,5-diisopropyl-4-hydroxybenzyl alcohol; 3-isopropyl-5-t-butyl-4-hydroxybenzyl alcohol; 3,5-di-t-butyl-4-hydroxybenzyl alcohol; and 3-t-amyl-5-cyclohexyl-4-hydroxybenzyl alcohol.

Some lower members of these alcohols are low melting materials liquid at room temperature, while higher molecular weight alcohols are white crystalline solids. They may be prepared in a variety of ways, such as by the oxidation of 3,5-dialkyl-4-hydroxytoluene to the corresponding 3,5-dialkyl-4-hydroxybenzaldehyde, and the consequent reduction of the latter to the alcohol:

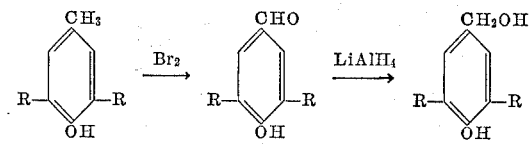

The alcohols are relatively insoluble in water, somewhat soluble in paraffins and aromatic liquids and soluble in oxygenated organic liquids such as alcohols and ethers.

In addition to their antioxidant properties, the hydroxybenzyl alcohols have other useful characteristics. It has been observed, for example, that they are somewhat less volatile and stabler at high temperatures than the corresponding hydroxytoluene compounds which are derived from them. Furthermore, in light-colored elastomeric substrates, the benzyl alcohols of the invention are both non-discoloring and non-staining. Unlike many of the common phenylene diamine antioxidants, the benzyl alcohols do not discolor light-colored rubber objects in which they are incorporated. Furthermore, they do not migrate from the rubber product into adjacent substances, such as lacquered or enameled surfaces in contact with the product.

The composition of the invention comprises organic materials normally subject to oxidative deterioration which contain a small stabilizing amount of the 3,5-dialkyl- 4-hydroxybenzyl alcohol described. By organic materials normally subject to oxidative deterioration are meant those substances containing carbon to carbon bonds and which, in the course of combining with atmospheric oxygen, suffer a degradation of their properties. These materials include hydrocarbon materials such as kerosine and gasoline, which upon prolonged storage tend to discolor and deposit undesirable gums and sludges. The hydroxybenzyl alcohols are also useful stabilizers for hydrocarbon oils heavier than gasoline, particularly oils whose viscosity, density and lubricating properties render them useful as engine lubricants. Small amounts of the hydroxybenzyl alcohol in paraffin or natural wax afford compositions which are stabler and more resistant to oxidative attack than the waxes alone.

Also included are hydrocarbon polyolefins, including the normally solid plastic polyolefins represented by polythene and polypropylene, which in the course of exposure to air and light harden, discolor and become brittle. Other polymers subject to oxidative deterioration are the elastomers including natural rubber and such synthetic rubbers as GR–S, polybutadiene and polyisoprene which deteriorate by hardening, cracking and checking and by losing their resiliency and mechanical strength.

When natural or synthetic rubber containing the dialkyl hydroxybenzyl alcohols described is processed, as by milling, curing or molding, the compositions are subjected to high temperatures which tend to volatilize some or all of the stabilizer in the rubber. However, the incorporation into the rubber of the stabilizer prior to processing renders the resulting rubber composition resistant to oxidative deterioration in the course of such processing as long as the stabilizer lasts. By incorporating the hydroxybenzyl alcohols into rubber compositions not exposed to high temperatures, such as rubber latices which are employed in paint or are coagulated by acid treatment, rubber-stabilizer compositions of enduring stability are achieved. Such stability is manifested by better retention of color, strength and elasticity and resistance to cracking, checking and tearing.

All of these materials may be stabilized against oxidation by incorporation therein during or after manufacture of the hydroxybenzyl alcohols described. Addition of the liquid or crystalline alcohol to the liquid hydrocarbon fuels presents, of course, no problem, and the alcohol may be added in the form of a concentrate comprising a solution of the alcohol in a small amount of either of the fuel itself, or an inert mutual solvent. The hydroxybenzyl alcohols may be compounded with the resins or elastomers by addition to the materials at the latex stage, during processing on Banbury mills or with other substances added to the polymers in the course of manufacture.

Organic foodstuffs may also be stabilized against oxidation by placing them in intimate contact with the 3,5-dialkyl-4-hydroxybenzyl alcohols described. Representative foods include fruits, including oranges, pineapples, bananas, etc.; vegetables, such as eggplant, squash, avocados, etc.; dairy products, such as milk, dried milk powder, butter, chocolate, ice cream, cheese and the like; and poultry, including chickens, ducks, geese, and turkeys. It has been determined that the toxicity of the dialkyl hydroxybenzyl alcohols of the compositions of the invention is considerably less than at least one other stabilizer conventionally added to foodstuffs, as shown by the rat feeding tests summarized in the following table.

| Stabilizer: | $LD_{50}$ dose, g./kg. body wt. |
| --- | --- |
| 2,6-di-t-butyl-4-methyl phenol | 1.5 |
| 3,5-di-t-butyl-4-hydroxybenzyl alcohol | >15 |

It will be seen that food compositions containing the dialkyl hydroxybenzyl alcohols in stabilizing amount will be at least as safe for animal consumption as those containing that noted, a commercial stabilizer.

Particularly useful compositions are edible fats and oils of vegetable, animal or mineral origin and which upon storage for extended periods of time tend to develop rancid tastes and odors. Their period of time to rancidity is considerably extended by incorporation in these oils of such dialkyl hydroxybenzyl alcohols as 3,5-di-t-butyl-4-hydroxybenzyl alcohol or 3-methyl-5-t-butyl-4-hydroxybenzyl alcohol. Typical oils include linseed oil, menhaden oil, cod liver oil, castor oil, olive oil, rapeseed oil, coconut oil, palm oil, corn oil, sesame oil, peanut oil, babassu oil, lard, beef tallow and the like. Also capable of stabilization in like manner are oils and fats which have been previously subjected to such treatments as air blowing, heat treatment and hydrogenation.

The alcohols may be physically incorporated with the foodstuffs or they may be employed at the surface of the foodstuffs as, for example, by impregnating the paper wrappers thereof with the anti-oxidant. In most organic materials packaged in solid form, such as butter, soap, bakery products and candy, oxidative attack occurs mostly at the surface of the material. As a consequence, it is more important to provide the antioxidant at the surface than in the bulk of the packaged item. The most economical use of the 3,5-dialkyl-4-hydroxybenzyl alcohol in such uses is made by employing it only at the surface. This can be best effected by incorporating the antioxidant in paper, paperboard or other cellulosic sheet used in whole or in part for packaging the material.

It is well known that traces of chemicals present in paper products actually catalyze the oxidation of fatty organic materials in contact with the paper. Incorporation of stabilizing amounts of the 3,5-dialkyl-4-hydroxybenzyl alcohol described above in the paper serves both to suppress this oxidation catalysis and to preserve the material in contact with the board from normal oxidation resulting from prolonged exposure to air. The alcohol may be combined with the paper by conventional papermaking methods, for example, by applying it to the paper leaving the Fourdrinier machine by calendering onto the paper a solution or oil-in-water emulsion thereof.

The hydroxybenzyl alcohol may also be applied to such foods as meat and fish by spraying a dispersion thereof onto the surface of the material prior to storage or transportation of the foods. By using food compositions having the alcohol in intimate contact with their surface, the development of rancidity and discoloration is repressed for extended periods of time.

In addition to the preservation of foods intended for human consumption, the 3,5-dialkyl-4-hydroxybenzyl alcohols are useful for suppressing oxidation in animal or poultry foods. For example, the hydroxybenzyl alcohols may be incorporated in silage and in poultry feed to prevent the development of rancidity and other undesirable off-tastes and odors. The additive may be incorporated in the feed in any suitable manner. When the feed is processed, i.e., cooked, pelleted, ground, etc., the hydroxybenzyl alcohol may be incorporated before processing in order to protect the vitamins A and E therein from degradation during handling, or it may be mixed therein after treatment. The alcohol may be used in such applications in the form of a dust, a spray, an emulsion, a solution or a solid.

Other organic substrates normally subject to oxidative deterioration which may be stabilized with the 3,5-dialkyl-4-hydroxybenzyl alcohols are esters, particularly such higher fatty esters as those of the fatty acids, e.g., methyl linoleate, ethyl stearate, methyl palmitate and the like; and aldehydes such as nonaldehyde, which, upon exposure to air, oxidize to the corresponding acid.

The amount of 3,5-dialkyl-4-hydroxybenzyl alcohol in the composition of the invention is that amount sufficient to stabilize the composition against oxidation. The requisite amount will, of course, depend on the efficacy of the particular hydroxybenzyl alcohol employed and the nature of the normally oxidizable material with which it is in intimate contact. It may be generally said that this amount will range from about 0.00001% by weight, based on the material, to about 5% by weight on the same basis. For example, suitable concentrations of the benzyl alcohols in distillate fuels, e.g., gasoline, kerosene, furnace oil, are on the order of 0.0007–0.0028% w. For such fuels, the preferred concentration range of these compounds will be from about 0.0001% w. to about 0.1% by weight, more especially to about 0.05% w. For some applications where the composition is subjected to more drastic conditions, such as rubber, the composition will require up to 10% by weight, based on the oxidizable material, of the 3,5-dialkyl-4-hydroxy-benzyl alcohol.

It will be understood that in addition to containing a stabilizing amount of the dialkyl hydroxybenzyl alcohol the organic compositions of the invention may include such other ingredients as other antioxidants, pigments, fillers and the like. For example, in some preparations, it may be desirable to employ the dialkyl hydroxybenzyl alcohols in combination with polynuclear phenolic inhibitors to obtain both low-temperature and high-temperature protection.

The following examples will serve to illustrate the nature of the invention. It should be understood, however, that the examples are merely illustrative and are not to be regarded as limitations on the appended claims, since the basic teachings therein may be varied at will as will be understood by one skilled in the art. In the examples, the ingredients are expressed in parts by weight unless otherwise indicated.

EXAMPLE I

Samples of polybutadiene rubber were prepared, each containing a small amount of an antioxidant, and the properties of the resulting compositions determined. Results of these tests are shown in the following table.

*Table I*

| Stabilizer | Parts Stabilizer Per 100 Parts Polybutadiene | Initial Mooney Viscosity | Mooney Viscosity Retention, percent After Aging at 110° C. | | |
|---|---|---|---|---|---|
| | | | 1 Hr. | 3 Hr. | 5 Hr. |
| Phenyl beta-naphthyl-amine | 1.5 | 35.5 | 99 | 83 | 72 |
| 3,5-Di-t-butyl-4-hydroxy-benzyl alcohol | 1.0 | 42 | 95 | 86 | 74 |
| Oxycresyl camphene resin | 1.0 | 38.5 | 77 | 56 | 42 |
| N,N'-diphenyl-p-phenylene diamine + Phenyl beta-naphthylamine | 0.35 + 1.0 | 41.5 | 99 | 93 | 83 |
| 2,2'-Methylene-bis(4-methyl-6-t-butyl phenol) + 3,5-Di-t-butyl-4-hydroxybenzyl alcohol + Dilauryl thiodipropionate | 1.0 + 1.0 + 1.0 | 39.5 | 95 | 81 | 75 |
| Oxycresyl camphene resin + Dilauryl thiodipropionate | 1.0 + 1.0 | 38.5 | 99 | 86 | 80 |

It will be seen from these data that the rubber composition containing the dialkyl hydroxybenzyl alcohol combined excellent oxidation resistance with superior discoloration resistance.

Similar results are obtained when the resistance to oxidation of both isoprene and natural rubber compositions containing 3,5-dialkyl-hydroxybenzyl alcohols are measured.

The polybutadiene compositions described above containing the hydroxybenzyl alcohol stabilizer also displayed superior resistance to discoloring as shown by Table II.

*Table II*

| Stabilizer | Color | |
|---|---|---|
| | Before Heat Aging | After Heat Aging |
| 3,5-Di-tert-butyl-4-hydroxy-benzyl alcohol | Light yellow | Yellow. |
| 3,5-Di-tert-butyl-4-hydroxy-benzyl alcohol + dilauryl thiodipropionate | Light cream | Light cream. |
| 2,2'-Methylene bis(4-methyl-6-tert-butyl phenol) | Light brown | Orange-brown |
| N,N'-diphenyl-p-phenylene diamine + beta-phenyl-naphthylamine | Brown | Brown. |
| Beta-phenyl-naphthylamine | Brown | Brown. |

EXAMPLE II

Induction periods of samples of a fatty ester containing various antioxidants were determined by storage of such samples in an oven at 50° C. until rancidity developed. Rancidity was established when a rapid increase in the weight of the ester mixture occurred and by odor and appearance of the ester at the time of the increase. The ester employed was methyl linoleate. Results of the measurements made are shown in Table III.

*Table III*

| Additive | Days to Rancidity Concentration, percent w. | | |
|---|---|---|---|
| | 0 | 0.01% | 0.04% |
| None | 4 | | |
| 2,2',6,6'-Tetra-tert-butyl biphenol | | 4¾ | 20½ |
| 4,4'-Methylene-bis(2,6-di-tert-butyl phenol) | | 9¼ | 20½ |
| 3,5-Di-tert-butyl-4-hydroxybenzyl alcohol | | 7½ | 19½ |

These data demonstrate that the ester-hydroxybenzyl alcohol compositions possess oxidation resistance comparable to that achieved with other well-known antioxidants.

EXAMPLE III

A sample of a commercial Wilmington gasoline, consisting primarily of a mixture of about 10% butane, about 30% straight run gasoline, about 20% sweetened thermal and catalytically cracked light pentanes, about 20% thermally cracked gasoline, and the remainder of hydrogenated catalytically cracked gasoline, was thoroughly washed to remove natural and added inhibitors. To small equal portion of this sample were added small amounts of the stabilizers noted below in concentrations of 10 mg./dl., and the induction periods for the stabilizers determined.

The determination was made by sealing the portions of gasoline containing the stabilizer in a bomb provided with pressure recording means, pressuring the bomb to 100 p.s.i.g. with gaseous oxygen, and immersing the bomb in a boiling water bath. The induction periods tabulated are the times which elapsed between immersion and the time at which each sample began to absorb oxygen at a rate exceeding 2 p.s.i.g. in 15 minutes. Table IV lists the antioxidants tested and their induction periods in comparison with the inhibitor period for washed, uninhibited gasoline.

*Table IV*

| Stabilizer: | Induction period, hrs. |
|---|---|
| None | 1.33 |
| 2,2',6,6'-tetra-t-butyl biphenol | 4.29 |
| 2,6-di-t-butyl phenol | 5.85 |
| 2,4,6-tri-t-butyl phenol | 7.15 |
| Bis(3,5-di-t-butyl-4-hydroxyphenyl) methane | 8.33 |
| 3,5-di-t-butyl-4-hydroxybenzyl alcohol | 13.75 |
| 2,6-di-t-butyl-4-methyl phenol | 13.05 |

Aging tests employing the two best stabilizers, in concentrations of 2 mg./dl. in the same treated gasoline, were also conducted. The results of these tests are presented in Table V. The temperature at which the samples were maintained was 70° C. In the first series of tests, the atmosphere was gaseous oxygen, while in the second it was air.

*Table V*

| Series | Stabilizer | Weeks | | | | | |
|---|---|---|---|---|---|---|---|
| | | 0 | | 1 | | 2 | |
| | | ASTM[1] Gum, mg./dl. | Peroxide, meq./ 100 g. | ASTM Gum, mg./dl. | Peroxide, meq./ 100 g. | ASTM Gum, mg./dl. | Peroxide, meq./ 100 g. |
| I | None | 7.4 | 0.06 | 48.4 | | | |
| | 3,5-Di-t-butyl-4-hydroxy-benzyl alcohol. | 7.2 | 0.06 | 37.6 | 2.65 | | |
| | 2,6-Di-t-butyl-4-methyl phenol | 6.4 | 0.06 | 31.8 | 3.01 | | |
| II | None | 5.8 | 0.08 | 18.6 | | 25.2 | |
| | 3,5-Di-t-butyl-4-hydroxy-benzyl alcohol. | 7.6 | 0.08 | 12.6 | | 23.8 | |
| | 2,6-Di-t-butyl-4-methyl-phenol | 5.6 | 0.08 | 11.8 | | 25.0 | |

[1] By ASTM tentative method D381-52T.

EXAMPLE IV

When 0.25-pound blocks of butter are stored at room temperature in bleached sulfite pulp handsheets containing 0.25% w. 3-methyl-5-isopropyl-4-hydroxybenzyl alcohol, the odor or rancidity from the resulting package requires at least twice as long to become apparent as that from blocks stored at identical temperature in samples of the same paper containing no antioxidant.

EXAMPLE V

When a sample of freshly cut alfalfa is sprayed with a 5% aqueous dispersion of 3,5-diisopropyl-4-hydroxybenzyl alcohol and then sun-dried and chopped, it is found that there is far less degradation of the vitamin content than in untreated samples, and somewhat less degradation than in samples treated with a dispersion of comparable concentration of 2,6-di-t-butyl-4-methyl phenol.

EXAMPLE VI

Weighed samples of alpha-cellulose pulp taken from the same sheet are each impregnated with a different stabilizer by dipping each sample into an alcoholic solution of the stabilizer, blotting the sample, and air drying it at room temperature. The dry samples are then weighed to determine the amount of antioxidant incorporated in them.

When dry, the samples are cut to 2" x 3" squares and a weighed amount of antioxidant-free lard is applied to both surfaces of the paper. The lard is spread in a thin film, completely covering the surface. Each sample is then placed in a one-quart bottle sealed with a screw cap and incubated at 110° F. The samples are removed daily from the oven and sniffed and rated by a three-man panel.

Under these conditions, the lard-paper samples containing 3,5-di-t-butyl-4-hydroxybenzyl alcohol are approximately ten times as stable at stabilizer concentrations of 0.5% w., based on the paper, than lard-paper samples containing butylated hydroxyanisole, about seven times as stable as samples containing equivalent amounts of a butylated hydroxyanisole-propyl gallate-citric acid mixture, about three times as stable as a mixture of equal parts of butylated hydroxyanisole and 2,6-di-t-butyl phenol.

EXAMPLE VII

A slab of bacon is stabilized against rancidity by soaking it in a 10% vegetable oil solution of 3-t-butyl-5-methyl-4-hydroxybenzyl alcohol until a stabilizing amount of the inhibitor has been incorporated in the bacon.

EXAMPLE VIII

To a sample of a conventional aircraft engine oil having the following properties

| | |
|---|---|
| Saybolt Universal viscosity at 210° F., sec. | 96.7 |
| Viscosity index | 109 |
| Pour point, undiluted, ° F | −10 |
| Pour point, diluted, ° F | −75 |
| Carbon residue, Conradson, percent w | 0.27 |
| Flash point, open, ° F | 510 | was added as a stabilizer 0.1% w. of 3,5-di-tert-butyl-4-hydroxybenzyl alcohol.

I claim as my invention:

1. A stabilized composition comprising essentially an organic material subject to oxidative deterioration having in intimate contact therewith an amount of 3,5-dialkyl-4-hydroxybenzyl alcohol sufficient to stabilize the material against oxidation, each of said alkyl radicals in said alcohol being a lower molecular weight alkyl radical.

2. A stabilized composition comprising a hydrocarbon material subject to oxidative deterioration having mixed therewith an amount of 3,5-dialkyl-4-hydroxybenzyl alcohol sufficient to stabilize the material against oxidation, each of said alkyl groups having from 3 to 8 carbon atoms and at least one of said alkyl groups being branched on the alpha carbon atom.

3. The composition of claim 2 wherein the hydrocarbon material is a liquid fuel.

4. A stabilized composition comprising an organic polymeric material subject to oxidative deterioration having mixed therewith an amount of 3,5-dialkyl-4-hydroxybenzyl alcohol sufficient to stabilize the material against oxidation, each of said alkyl groups having from 3 to 8 carbon atoms and at least one of said alkyl groups being branched on the alpha carbon atom.

5. The composition of claim 4 wherein the organic polymeric material is a polyolefin.

6. A stabilized composition comprising a hydrocarbon material subject to oxidative deterioration having mixed therewith an amount of 3,5-di-t-butyl-4-hydroxybenzyl alcohol sufficient to stabilize the material against oxidation.

7. The composition of claim 6 wherein the hydrocarbon material is gasoline.

8. The composition of claim 6 wherein the hydrocarbon material is a polyolefin.

9. A stabilized composition comprising an organic ester subject to oxidative deterioration, having mixed therewith an amount of 3,5-di-t-butyl-4-hydroxybenzyl alcohol sufficient to stabilize the ester against oxidation.

10. A stabilized composition comprising an organic foodstuff subject to oxidative deterioration having in intimate contact therewith an amount of 3,5-di-t-butyl-4-hydroxybenzyl alcohol sufficient to stabilize the foodstuff against oxidation.

11. A process for stabilizing an organic material normally subject to oxidative deterioration comprising intimately contacting the material with an amount of 3,5-dialkyl-4-hydroxybenzyl alcohol sufficient to stabilize the material against oxidation, each of said alkyl radicals in said alcohol being a lower molecular weight alkyl radical.

12. A process for stabilizing a hydrocarbon material normally subject to oxidative deterioration comprising mixing with the hydrocarbon material an amount of 3,5-dialkyl-4-hydroxybenzyl alcohol sufficient to stabilize the material against oxidation, each of the alkyl groups having from 3 to 8 carbon atoms and at least one of said alkyl groups being branched on the alpha carbon atom.

13. The process of claim 12 wherein the hydrocarbon material is a liquid fuel.

14. A process for stabilizing an organic polymeric material normally subject to oxidative deterioration comprising mixing therewith an amount of 3,5-dialkyl-4-hydroxybenzyl alcohol sufficient to stabilize the material against oxidation, each of the alkyl groups having from 3 to 8 carbon atoms and at least one of said alkyl groups being branched on the alpha carbon atom.

15. The process of claim 14 wherein the polymeric material is a polyolefin.

16. A process for stabilizing a hydrocarbon material normally subject to oxidative deterioration comprising mixing therewith an amount of 3,5-di-t-butyl-4-hydroxybenzyl alcohol sufficient to stabilize the material against oxidation.

17. The process of claim 16 wherein the hydrocarbon material is gasoline.

18. The process of claim 16 wherein the hydrocarbon material is a polyolefin.

19. A process for stabilizing an organic ester normally subject to oxidative deterioration comprising mixing therewith an amount of 3,5-di-t-butyl-4-hydroxybenzyl alcohol sufficient to stabilize the material against oxidation.

20. A process for stabilizing an organic foodstuff normally subject to oxidative deterioration comprising mixing therewith an amount of 3,5-di-t-butyl-4-hydroxybenzyl alcohol sufficient to stabilize the material against oxidation.

References Cited in the file of this patent

UNITED STATES PATENTS

| | | |
|---|---|---|
| 2,732,406 | Lambert | Jan. 24, 1956 |
| 2,838,571 | Filbey | June 10, 1958 |
| 2,841,623 | Norton et al. | July 1, 1958 |
| 2,962,531 | Coffield | Nov. 29, 1960 |

OTHER REFERENCES

J. Organic Chem., November 1957, vol. 22, p. 1435.